(12) United States Patent
Singer et al.

(10) Patent No.: US 6,353,490 B1
(45) Date of Patent: Mar. 5, 2002

(54) C/N PERFORMANCE OF BROADBAND TWO-WAY TRANSMISSION OF RF SIGNALS OVER TRANSMISSION MEDIUMS WITH LIMITED BANDWIDTH

(75) Inventors: Samuel Singer; Harry Krasnikoff, both of Indiana, PA (US); Maximo V. Morales, Weston, FL (US)

(73) Assignee: Quintech, Inc., Indiana, PA (US)

( * ) Notice: Subject to any disclaimer, the term of this patent is extended or adjusted under 35 U.S.C. 154(b) by 0 days.

(21) Appl. No.: 09/310,510

(22) Filed: May 12, 1999

(51) Int. Cl.[7] .............................................. H04B 10/00
(52) U.S. Cl. ..................... 359/145; 359/124; 359/154
(58) Field of Search ................................ 359/162, 124, 359/154, 125, 145; 370/480; 455/103

(56) References Cited

U.S. PATENT DOCUMENTS

| | | | |
|---|---|---|---|
| 4,309,769 A | | 1/1982 | Taylor, Jr. |
| 4,935,709 A | | 6/1990 | Singer |
| 5,187,803 A | | 2/1993 | Sohner et al. |
| 5,280,246 A | * | 1/1994 | Takahashi .................... 324/322 |
| 5,390,337 A | | 2/1995 | Jelinek et al. |
| 5,481,073 A | | 1/1996 | Singer et al. |
| 5,500,758 A | | 3/1996 | Thompson et al. |
| 5,557,319 A | | 9/1996 | Gurusami et al. |
| 5,602,876 A | * | 2/1997 | Noneman .................... 375/317 |
| 5,606,725 A | | 2/1997 | Hart |
| 5,640,694 A | * | 6/1997 | Milton ........................ 455/133 |
| 5,642,155 A | | 6/1997 | Cheng |
| 5,859,854 A | | 1/1999 | Reudink |

OTHER PUBLICATIONS

B. Bauer and J. Holobinko, "Return–Path Management: Integrating OFDM Schemes with Emerging Technologies to Assure Clean and Abundant Upstream Signals", Cable–Tec Expo® '96 Proceedings Manual, Jun. 10–13, 1996, Nashville, TN, pp. 3, 267–278.

Keith E. Kreager, "Designing an Optical System from the Headend to the Node: FTTE, SSB or a Hybrid?", Cable–Tec Expo® '96 Proceedings Manual, Jun. 10–13, 1996, Nashville, TN, pp. 3, 132, 142.

Kuti Josefsberg, "Efficient Comb Generator Sampler Locks DRO to 100 MHz Input", *Microwave Journal*, May 1991, pp. 303–306.

(List continued on next page.)

*Primary Examiner*—Jason Chan
*Assistant Examiner*—Agustin Bello
(74) *Attorney, Agent, or Firm*—Buchanan Ingersoll, P.C.

(57) ABSTRACT

The bandwidth of a two-way broadband signal transmission system is expanded by frequency stacking shared band signals. The up conversion (stacking) and down conversion (destacking) systems utilize matched filters, preferably in a multiplexer configuration, which are directly connected, without a combiner, to output the stacked frequency signal in the case of the up conversion system, and without a splitter to separate the frequency stacked signals in the down conversion system. A single base local oscillator signal is used to generate all of the local oscillator signals needed in the system for up and down conversion. In a coax/HFC cable system in which shared band signals from multiple groups of subscribers are frequency stacked in service area nodes for transmission to a headend containing the down conversion system, the single base local oscillator signal is generated by a redundant high quality local oscillator in the headend and transmitted to all of the service area nodes in the broadband downstream signal. A comb generator in each service area node and in the headend generates the local oscillator signals needed for up/down conversion as harmonics of the base local oscillator signal for system wide frequency stability. The frequency stacked signals can be further frequency stacked for hub-to-hub and hub-to-headend interactive broadband signal transport.

34 Claims, 9 Drawing Sheets

OTHER PUBLICATIONS

R. Howald, M. Aviles, F. McMahon, "Increasing HFC Capacity Using Block Frequency Conversion", *Communication Systems Design*, Dec. 1997, pp. 36–44.

"Preview of General Instrument Technology", *General Instrument Transmission Network Systems*, 5 pages.

Jim Mabry, "Breaking the Return Bottleneck", *Networking Advanced Networking Technology*, CED/Sep. 1998, pp. 49–54.

M. Ryba, J. Waltrich, "Pointers on Picking RF Upconverters for Digital" *Communications Technology,* Jun. 1997, pp. 99–110.

L. Tamil, J.R. Cleveland, "Optical Wavelength Division Multiplexing for Broadband Trunking of RF Channels to Remote Antennas", *1997 IEEE*, pp. 1062–1066.

S. Han, M. Vaughn, J. Laskar, D. Blumenthal, "Simulation of a Subcarrier Multiplexed Communications System: A Performance Enhancement Tool", *1996 IEEE MIT–S Digest*, WE3F–22, pp. 895–898.

* cited by examiner

C/N PERFORMANCE OF BROADBAND TWO-WAY TRANSMISSION OF RF SIGNALS OVER TRANSMISSION MEDIUMS WITH LIMITED BANDWIDTH

BACKGROUND OF THE INVENTION

1. Field of the Invention

This invention relates to the transmission of radio frequency (RF) signals over fixed transport mediums and in particular where the bandwidth needed exceeds that currently available over the transport medium. It has particular application to interactive (two-way) cable television (CATV) systems, but is also applicable to other wideband signal transport and distribution systems such as broadcast facilities (studio, exciter, transmitter), telephone public switched networks, local area networks (LANS), wide area network (WANS), medium area networks (MANS), wideband signal transport and distribution corporate/institutional networks, and teleports/antenna farms.

2. Background Information

The Information Revolution is deemed to become the leading economic driving force of the next millennium. Information will be the primary commodity of the 21st century. The ability to store, retrieve, transport and access information will be the dominant measure of success. Although the World Wide Web (www) is being deployed rapidly, access to the Internet is still limited by, and dependent on, the limited bandwidth of the connecting medium which limits access speeds. With the exception of major corporate, institutional and government networks, most users can only tap into this ocean of information using an ordinary analog telephone line, which limits the access rate to less than 56.6 Kbs (typically as low as 14.4 or 28.8 Kbs in remote areas).

As telecommunications systems evolved through the 20th century, multiple transport and delivery mediums have been deployed for disseminating all forms of information; data, audio, telephony and video, for a multitude of users and services. These mediums include the Public Switched Telephone Networks (copper and fiber); Broadcasting (radio, television and wireless communications); Satellite (Geostationary, DBS and LEO's); Terrestrial Microwave; Continental and transoceanic cables (copper, coax and fiber); Cable Television or CATV (coaxial and Cable/HFC); and Wireless Cellular Telephone Networks, both analog (AMPS) and digital (PCS), which use a network of switching cells connected via the public telephone network and direct satellite links.

Since Internet access is basically data transfer over a transport medium, all of these telecommunications networks have the ability to provide Internet access, within specific limitations, and with distinct advantages and disadvantages for each medium. With almost 100% deployment in north America, highly evolved in western Europe and rapidly expanding in developing nations, the Public Switched Telephone Networks commonly referred to as POTS (Plain Old Telephone Service), are today the connection of choice for Internet access. Although major advances are being made in improving the ability of the public telephone networks to carry high speed data, the limiting factor remains the original copper pair connecting most subscribers to the central office, which was historically intended only for narrow band (3 kHz) voice transmission, and the point-to-point architecture of the worldwide telephone network which is not suitable for the point-to-multipoint "broadcasting" of data. Advances in DSL (Digital Subscriber Line) technology greatly increase data delivery rates to subscribers over the existing copper plant, but still limit return bandwidth (subscriber to network) to ISDN rates (128 Kbs max.), and only over very limited distances.

Geostationary communications satellites, especially high power direct broadcast satellites (DBS), are ideally suited for the dissemination of large amounts of information (video, data, audio) to millions of users over large geographic areas, even in underdeveloped, scarcely populated regions. This offers a major advantage over the telephone networks for the high speed delivery of Internet data to subscribers (6 to 8 times faster than telephone lines), but interactive, 2-way communications is still restricted to the bandwidth limitation of a traditional telephone line which must be used for the subscriber's return access to the Internet. A further limitation of Internet access via satellite is the fact that satellites have a limited number of transponders with limited total bandwidth (typically 24 transponders with 36 MHz each). Since their geographical coverage (footprint) is very large, this limited bandwidth becomes rapidly saturated in highly populated areas, even if each subscriber chose to make a major investment in an expensive, private satellite uplink (VSAT).

The third readily available transport medium for high speed internet access are the Cable Television (CATV) networks (both coaxial and Hybrid Fiber/Coax (HFC) systems), widely deployed since the 50's for subscriber based, multi-channel television delivery. Connecting over 70 million homes in the USA today, the world wide subscriber base is projected to grow to some 400 million by 2005. Like satellites, these networks are ideally suited for broadcasting information point-to-multipoint, from the headend directly to subscribers' homes. The bandwidth of these Cable/HFC networks have been continually expanding from an upper limit of 250 MHz to 860 MHz today and beyond. They offer the widest bandwidth direct conduit to the subscriber. Although the expanded bandwidth now available has resulted in many new services being offered by the MSO's (multiple-system operators) they remain largely a unidirectional downstream (headend or hub to subscriber) transport medium (50–750 MHz), with very limited upstream (return path) capabilities (only 5–42 MHz bandwidth). Because these systems have historically been designed primarily to deliver multiple TV channels, the return paths have not been fully implemented, and suffer major noise ingress and interference problems. This limited return path bandwidth was traditionally reserved for system control, performance monitoring and service authorization uses. Although the advanced cable modems currently being deployed in large numbers provide the fastest internet download speed available (20 to 100 times faster than a telephone line), subscriber access in the reverse direction is still predominantly via the limited upstream bandwidth available or the Public Telephone Switched Network, restricting the World Wide Web connection to very high speed data dissemination and low speed access and response by the end user. This today is the major bottleneck in the system, limiting the availability of advanced interactive services such as high speed internet access, video-on-demand, on-screen shopping, banking and brokerage services at home, playing interactive video games, responding to polls, and telephony service over the Cable/HFC plant.

Modem Cable/HFC (hybrid fiber/coax) networks and other telecommunications platforms designed for the transmission and dissemination of high speed data comprising multi-channel, analog and digital television, and advanced interactive internet, e-mail, and other services require very large bandwidth to be shared by multiple users, with 50–750 MHz bandwidth available downstream, and only limit 5–42 MHz available upstream bandwidth.

Typical systems in use today employ optical nodes in the downstream path serving up to 2000 subscribers within a service area, who share the 5–42 MHz return path bandwidth available. Downstream signals are delivered to these nodes by laser transmitters over optical fiber cables. These optical transmissions are converted in the nodes to RF modulated carriers, and delivered to individual subscribers connected to the nodes by coaxial cables. The downstream and upstream signal flows are separated by diplexers with a cross-over frequency at approximately 50 MHz. Typically downstream signals are split into 4 individual outputs, each serving 500 subscribers. The signals from the 4 return inputs are combined (summed), and transmitted back to the headend on a separate fiber.

More advanced services, especially telephony over Cable/HFC networks, also mandate redundant powering of the system via the coaxial cable plant, just as the public telephone network provides power to the subscriber's telephone, ensuring availability of service in the event of power failures. This has not historically been a concern for Cable TV systems where distribution amplifiers and nodes have been powered locally, since loss of a TV signal was only deemed an inconvenience. The new requirement for distribution of power over the very large networks, powering hundreds of high current amplifiers and very complex nodes distributed over very large geographical areas, mandates that all active elements must be designed for optimum efficiency and lowest attainable power consumption.

Block frequency up conversion and down conversion has been extensively used in the telecommunications industry for a multitude of applications. Most common applications are in multi-stage heterodyne receivers, transmitters and transceivers; UHF to VHF band converters in television receivers; television set-top converters; all forms of transmitter exciters and modulators. A classic use of the technology is found in Satellite Television Receive Only (TVRO) applications (both SatComm and DBS systems) where KU band (14–14.5 GHz) and C-Band (3.7–4.20 GHz) downlink frequency bands (500 MHz total bandwidth) are block down converted to a common L-Band (950–1450 MHz) by a low noise block down converter (LNB), or a combination of low noise amplifier (LNA) and block down converter (BDC) for signal distribution and further signal processing at L-band. This application is discussed in U.S. Pat. No. 4,935,709 titled "Switchable Coupling Apparatus for Television Receive Only Installations," issued Jun. 19, 1990. As disclosed in this prior art, the BDC 1200 C-Band to L-Band block down converter is the basic system element which permits efficient and cost effective distribution of signals received from satellites to multiple users, and allows each of the users to access any of the multiple signals carried by the coaxial transport medium.

The traditional block up converter and down converter consist of an input filter, which limits the input bandwidth to the desired block of frequencies to be converted; an amplifier to provide the proper signal level to the RF port of the mixer; an appropriate mixer which mixes the RF input frequencies with a local oscillator (L.O.), the frequency of which is selected so that the sum (or difference) of the mixed frequencies appears at the output of the mixer in the desired frequency band; and an output filter which rejects (stops) all frequencies other than those of interest from appearing at the output. Additional amplifiers and matching elements may be used as desired for various applications. Typically, block converters have a single conversion stage (1 mixer). Depending on specific applications and system performance specifications, dual conversion (2 mixers, 2 L.O.'s), or multiple-stage converters may be used, which increases the size, complexity and adversely impact reliability and power consumption.

The L.O. signal is a critical element of the system, since the frequency stability, the signal purity and signal level all directly affect the final quality of the output signal. L.O.'s may be direct oscillators (L/C, cavity resonators, dielectric resonators, voltage controlled oscillators (VCO's) or any other type of stabilized signal sources). Modem frequency converters prefer Phase Locked Loop (PLL) circuitry for L.O. generation. These highly evolved specialized circuit elements compare a sample of the oscillator frequency, divided down by a prescalar circuit, to a reference frequency, with error correction fed to the local oscillator which acts to keep the L.O. extremely accurate and stable under all operating conditions. In advanced systems, the PLL can be digitally controlled to generate any desired L.O. frequency.

Rapid recent advances in modulation techniques demand higher stabilities (0.5 ppm or less), and extremely low phase noise (less than 70 dBc @ 1 Khz offset), with minimum phase jitter. The performance of the PLL circuit tends to limit the performance of the system. Although low phase noise (less than 130 dBc @ 1 Khz offset) highly stabilized reference oscillators have been developed for advanced systems, a typical PLL circuit degrades this specification considerably, resulting in a much higher (50 dBc or more) phase noise @ 1 Khz offset. Using multiple conversion stages as discussed above mandates using multiple PLL's (phase locked loops), which further increases phase noise and jitter.

The other critical elements of a traditional block conversion circuit are the filters used to limit the input and output frequencies to the desired bands, selecting the input frequency band and eliminating the unwanted carriers, the L.O. and its harmonics and all of the mixing products which are generated by the (RF+/−L.O.) mixing process from the output. Filter technology has evolved highly since the first tuned radio circuits were invented, and filters are today available in a proliferation of packages, technologies and performance.

Although there exists extensive prior art for the design and use of block down converters and up converters in both traditional and modern telecommunications systems, and all of the circuit elements are readily available and their use and performance extensively documented, these circuits do not readily lend themselves to certain applications. Like all frequency and bandwidth sensitive products, both the operating frequencies and bandwidths over which these circuits must operate drastically limit their performance, and thus their usefulness for some applications.

A number of standard schemes for using multiple block frequency converters in a "stacked" configuration (sequential 5–42 MHz bands frequency multiplexed in predetermined sequence or "stack") have been developed for use in expanding the available (5–42 MHz) bandwidth of the return path in advanced Cable/HFC networks. Due to the inherent performance limitations of such circuits and other system issues, these approaches have not proven successful to date.

As discussed above, the most critical elements of a frequency block converter are the PLL's used to generate the L.O. frequency and the filters used to select the wanted input and output signals and reject the rest. The Cable/HFC system, specifically the optical nodes in which these converters are to be used, represent a very adverse operating environment, and place very difficult performance constraints on these critical circuit elements. Operating temperatures inside a node housing (which is typically mounted outdoors on a telephone pole) may run up to 85° C. or above, and are subject to large temperature fluctuations with changing weather conditions. This has a direct impact on L.O. frequency stability, and causes changes in filter response and performance. The PLL circuitry is complex, uses many active components, and requires considerable current to operate. Since at least 3 individual PLL's have to be used in the traditional approach to quadruple the available bandwidth, this is a major concern to the frequency conversion system designer.

Although filters can be designed to operate over large temperature variations while maintaining specified passband and out-of-band rejection performance, the Cable/HFC application imposes a major challenge on the block frequency converter designer. Traditional filters are designed with a given center frequency, percentage pass bandwidth and out-of-band rejection performance based on the separation of any frequency which must be rejected from the center frequency of the filter. Many filter designs have evolved over the years to meet pass band/rejection tradeoffs, typically optimized for very narrow band <1% , general filter applications of 1 to 20% bandwidth, and very wide band 100% to multi-octave. Attempting to upconvert the 5–42 MHz upstream return band in Cable/HFC systems results in an extremely narrow guardband between the stacked channels (band starts at 5 MHz), and a pass bandwidth variation ranging from 3 octaves for the first filter 'A' (5–42 MHz); 50% bandwidth for filter 'B' (62–99 MHz); 28% bandwidth for filter 'C' (114–151 MHz) and 20% for filter 'D' (166–203 MHz) in the particular frequency plan of the present invention. The filter performance both in the pass-band and out-of-band rejection must be maintained and be the same for all of the filters over the extreme percentile bandwidth variation and very narrow but equal guardbands between the four filters. A further challenge is introduced by the fact that the operating frequencies shift from low RF through VHF and into the UHF band, over which frequency ranges commonly available components and materials change characteristics. In addition, filter performance depends on the Q-factor of the tuned circuits, and over this multi-octave frequency range obtaining a high Q mandates the use of air inductors within tightly shielded enclosures, which requires a lot of space, and space is at a premium within an optical node.

Another constraint on the performance improvement attainable by the use of a frequency stacking block conversion system in Cable/HFC networks is that the outputs of the four frequency bands generated by the up converters in the node have to be combined (summed) into a single output for transmission back to the headend over a single optical fiber. A common 4 way combiner is normally used to accomplish this, but at a loss of 7 to 8 dB introduced by the combining process.

Alternate approaches to the use of block frequency conversion techniques for expanding return path bandwidth in Cable/HFC systems include multiple optical fiber returns from each service area, which provides relatively infinite bandwidth, but is very expensive and can only be implemented in new builds. Older networks based on signal distribution over coaxial cable cannot be upgraded cost effectively.

There is a need therefore for an improved apparatus and method for transmitting over a common transmission medium RF signals which exceed in bandwidth the bandwidth available in systems of existing design.

There is a more specific need for an improved apparatus and method for transmitting a plurality of shared bandwidth RF signals, such as for example, subscriber return signals in a CATV system over a common transmission medium.

There is a related need for improved apparatus and method for frequency stacking and de-stacking such multiple shared bandwidth RF signals.

There is a more particular need for such an apparatus and method which does not degrade the C/N ratio of the system and provides improved carrier to noise (C/N) ratios over existing systems.

There is also a need for such an apparatus and method which eliminates the need for multiple phase locked loops and multiple LO's.

There is an overall need for such apparatus which reduces the number of components and power consumption.

SUMMARY OF THE INVENTION

These needs and others are satisfied by the invention which is directed to a new RF block frequency conversion apparatus and method for providing greater bandwidth for the transmission of a plurality of shared bandwidth signals particularly as return signals in a two-way RF signal transmission system. More particularly, the invention is directed to RF block frequency conversion apparatus for processing n shared-band RF signals in a cable TV system. The apparatus includes mixer means for either up or down frequency conversion of n−1 of the n shared band RF signals between the shared band and n−1 different frequency bands. The apparatus also includes n bandpass filters including n−1 bandpass filters for each of the n−1 different frequency bands connected to the mixer means and one bandpass filter for the shared band. All n of the bandpass filters are connected without combiners in the case of up conversion or splitters in the case of down conversion to a common node at which a frequency stacked RF signal having the n RF signals stacked in n frequency bands is present. By eliminating the splitters in the case of down conversion and the combiners in the case of up conversion, the C/N (carrier to noise ratio) of the system is improved by about 7 dB.

The invention also embraces RF block frequency conversion apparatus in which the mixer means includes means for providing a signal of a selected RF frequency as a base local oscillator signal. Additional local oscillator signals are generated from the base local oscillator signal. Preferably these additional oscillator signals are harmonics of the base oscillator signal and are generated by a comb generator. This arrangement eliminates the need for PLLs which greatly reduces the phase noise and phase jitter and enhances system performance. A common base oscillator signal can be used for both up converting (stacking) and down converting (destacking) thus a single, high quality oscillator is appropriate. In a two-way cable system in which the up conversion apparatus is located in a node within a service area and the down conversion apparatus is located in a headend, the oscillator generating the base local oscillator signal can be conveniently located in the headend where it supplies a part of the base oscillator signal directly to the down conversion apparatus. The base oscillator signal can also be transmitted within the broadband downstream RF signals to the service area node where it is extracted for use in the up conversion apparatus. In a system having multiple service area nodes, this common base oscillator signal generated in the headend can be transmitted with the broadband downstream signal to each of the service area nodes for use in the associated up conversion apparatus. In a preferred arrangement, the two-way transmission system connecting the headend and the one or more service area nodes is a hybrid optic fiber cable (HFC) system while the subscriber branches emanating from the service area nodes are coaxial cables. In such a system, the broadband downstream signal is transmitted on a single fiber (or multiple fibers for redundancy) to each of the service area nodes while the stacked frequency RF return signal generated by each of the nodes is transmitted back to the headend on a separate fiber (which may also be duplicated for redundancy). Thus, each of the service area nodes can generate a stacked frequency RF signal containing multiple stacks of the same return path frequency bands.

The invention also encompasses the method of broadband two-way communication between a headend and a large number of subscribers in which a broadband RF downstream signal is generated at the headend and transmitted over a two-way transmission system to a number of service area nodes. This broadband RF downstream signal is then distributed from each of the service area nodes to associated groups of subscribers over a plurality of branches between the service area nodes and the groups of subscribers. Shared bandwidth RF signals from each group of subscribers are sent back to the associated service area node over these branches. The shared bandwidth RF subscriber signals are frequency up converted (stacked) in the service area node into a wider bandwidth stacked frequency RF return signal using a common base local oscillator signal. The stacked frequency RF return signals from each service area node are transmitted to the headend where they are frequency down converted (de-stacked) to extract the plurality of shared bandwidth RF subscriber signals in the original sequence. A primary or base local oscillator signal is generated and distributed to the headend for the frequency de-stacking and to each of the plurality of service area nodes for frequency stacking of the shared bandwidth RF subscriber signals.

A number of the frequency stacked RF return signals can be themselves frequency stacked to generate multiple frequency stacked RF return signals. Several stages of multiple frequency stacking can be implemented. This arrangement is particularly suitable for densely populated areas and can be used in complex systems to transmit return or subscriber signals from secondary rings for transmission over a primary ring to a headend.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
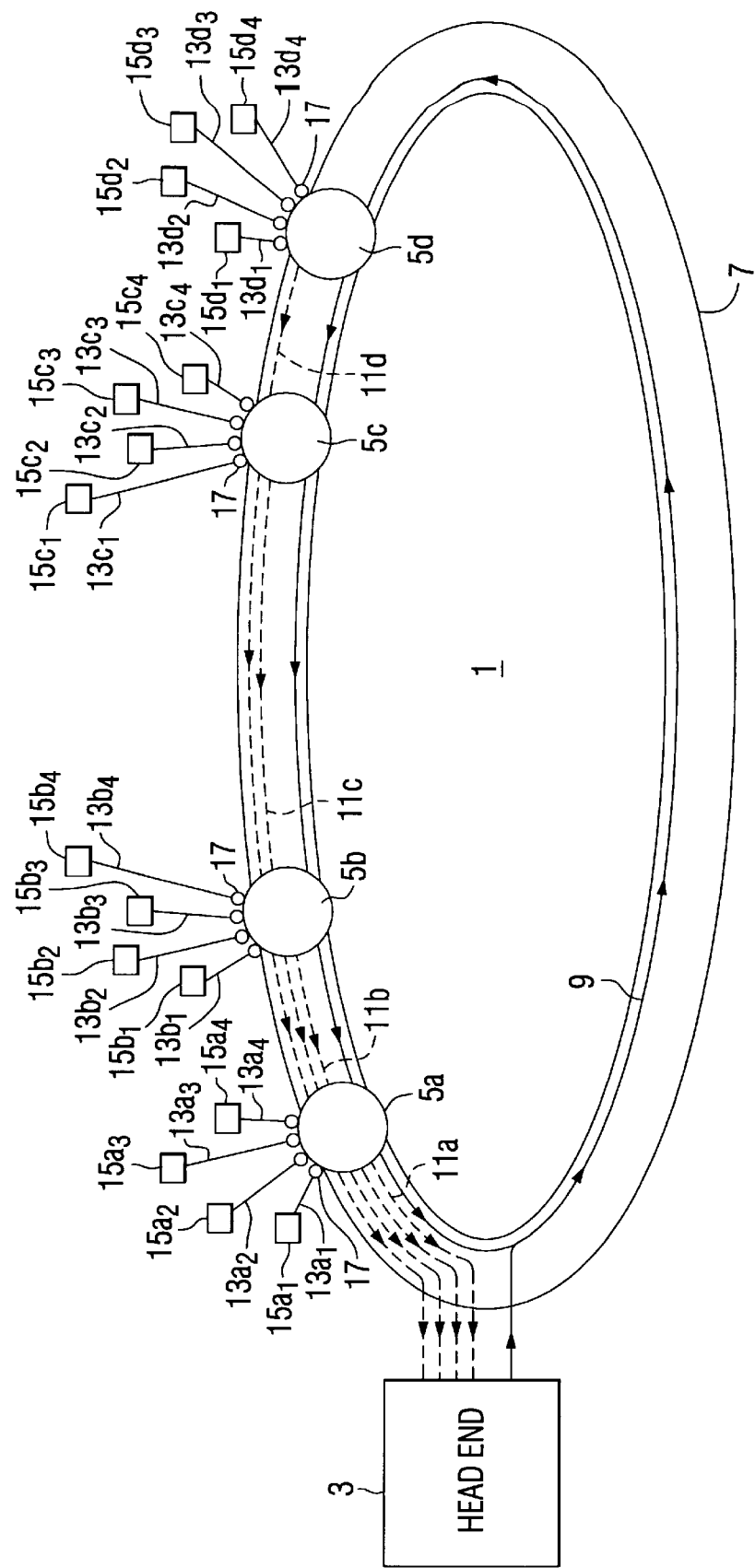
FIG. 1 is a schematic diagram of an interactive CATV system incorporating the invention.

The invention will be described as applied to an interactive CATV HFC system; however, as discussed above, it has application to other systems and methods for the transmission of radio frequency signals where the bandwidth needed exceeds that currently available and the transport medium is capable of carrying larger bandwidth. Turning to FIG. 1, the CATV system 1 includes a headend 3 and a plurality of service area nodes 5a–5d which are interconnected by a broadband signal transport system 7 which in this case is a optical fiber system including a single (primary) downstream fiber 9 which distributes the conventional broadband 50–750 MHz cable TV signal to each of the service area nodes 5a–5d. While not shown, duplicate downstream fibers can be provided for redundancy. The system 7 also includes a separate upstream optic fiber 11a–11d, connecting each of the service area nodes 5a–5d back to the headend, and again, each of these can be duplicated for redundancy. Each of the service area nodes 5 has four coaxial cable branches, such as $13a_1$–$13a_4$ through $13d_1$–$13d_4$ which in turn, are each connected through coaxial cables not shown to an associated group of, for instance, 500 homes $15a_1$–$15d_4$. Thus, each service area node 5 distributes the 50–750 MHz broadband RF signals to 2,000 homes or subscribers, and as the CATV system 1 is an interactive two-way system, the subscribers can send return signals upstream. All of the homes within the service area share the allocated return bandwidth. In the United States, this is typically 5–42 MHz, although other shared frequency bands could be used. For instance, in Europe, the standard is 5–65 MHz. In traditional CATV systems, all of the homes served by a service area node 5 feed through combiners into one input to the service area node. Thus, 2,000 subscribers shared a single 5–42 MHz frequency band. In our system, groups of for instance, 500 homes, feed into the service area node 5 through an assigned coaxial branch 13. Therefore, each group of 500 subscribers shares a common 5–42 MHz frequency band and the same 5–42 MHz frequency band is shared by the signals carried by the separate branches 13a–13d. As will be seen, the service area nodes 5 frequency stack the shared band RF signals received over the branches 13a–13d for transmission back to the headend over the assigned optical fiber 11a–11d. Diplex filters 17 with a cross over frequency of about 50 MHz (in the United States, 70 MHz in Europe) or other appropriate frequency are used to separate the 50–750 MHz downstream signals and 5–42 MHz upstream signals carried by the coax branches 13 at the service area nodes. As will also be described below, the four shared 5–42 MHz bandwidth signals received by a service area node 5 over the coaxial branches 13 are frequency stacked into a return RF signal having a bandwidth of 5–203 (or 5–198) MHz, or other frequency plan, in the case of the 5–42 MHz shared band.

Figure 2:
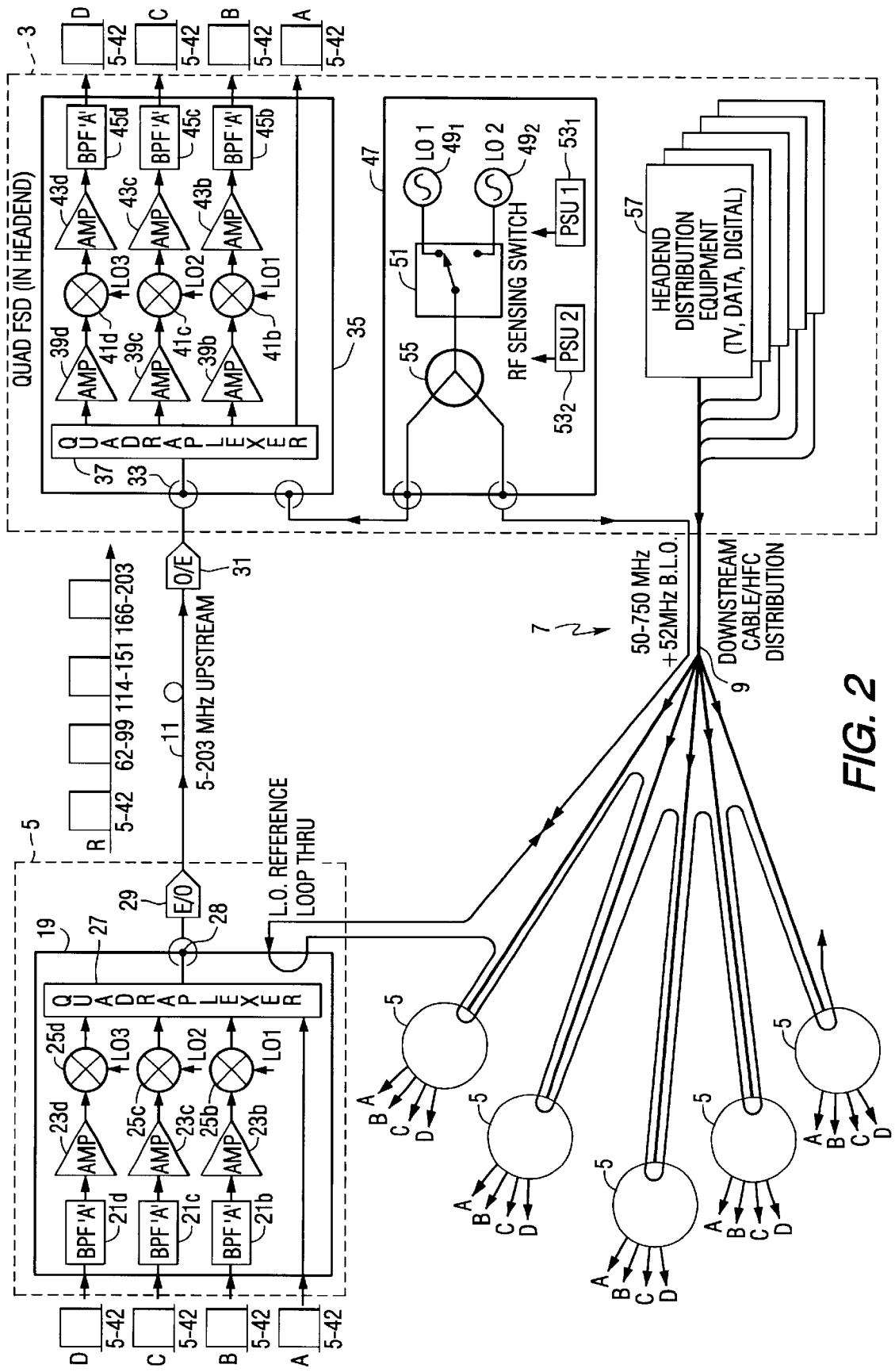
FIG. 2 is a schematic diagram illustrating in more detail features of the system of FIG. 1.

FIG. 2 illustrates the frequency stacking scheme utilized. Each service area node 5 includes an up frequency conversion system 19. As shown in the upper left-hand corner of FIG. 2, the 5–42 MHz shared bandwidth signals A–D are frequency stacked by the up frequency conversion system 19 into a stacked RF return signal R in which one signal remains in its initial shared bandwidth 5–42 MHz and the other shared bandwidth signals have been frequency shifted into bandwidths, in the example, of 62–99 MHz, 114–151 MHz and 166–203 MHz, respectively.

The 5–42 MHz shared bandwidth signals arrive at the node 5 on one of the associated branch coaxial cables 13 and pass through the associated diplexer 17 (see FIG. 1). Each of the signals A–D are applied to one of the inputs of the associated stacker 19. The shared bandwidth signals B–D are passed through an additional 5–42 MHz or "A" bandpass filter (BPF) 21$b$–21$d$ where required to filter or "shape" the input band to, for instance, limit noise ingress. These signals B–D are then amplified in additional amplifiers 23$b$–23$d$ to the required signal level of the inputs of mixers 25$b$–25$d$. These mixers shift the bandwidth of the signals B–D to a higher frequency which is determined by the frequency of a local oscillator (L.O.) LO1–LO3 applied to mixer L.O. port. The details of the frequency conversion will be discussed below; however, in the example, the mixers 25$b$–25$d$ shift the shared bandwidth signals B–D to signals in the 62–99, 114–151 and 166–203 MHz frequency bands, respectively. The A shared bandwidth return signal is not converted and is applied to an output filter 27. The details of this output filter 27 will be described in more detail below. In the exemplary system where there are four return signals, the filter 27 is a quadraplexer (4 filters with common output) which produces at an output 28 the RF return signal R in which the four shared bandwidth signals A–D are frequency stacked. The frequency stacked return signal R is used to modulate the laser in an electro/optic (E/O) interface 29 to transmit the frequency stacked RF return signal R over the dedicated upstream optic fiber 11.

At the headend 3 an opto/electric (O/E) interface 31 receives and demodulates the optical signal to extract the frequency stacked RF return signal R which is applied to an input 33 of a down conversion system 35. This down conversion system includes a quadraplexer 37 (4 filters with a common input and 4 separate outputs) which extracts the four separate frequency bands from the signal R. The separate frequency bands containing the B–D shared bandwidth signals are amplified in amplifiers 39$b$–$d$ to the required input signal levels of mixers 41$b$–$d$. The same frequency local oscillator signals LO1–LO3 as are used in the up conversion system are applied to the mixers 41$b$–41$d$ so that these B–D signals are converted to the shared frequency band. The shared frequency band signals B–D are amplified in amplifiers 43$b$–43$d$ and, if required, further filtered or shaped in "A" (5–42 MHz) bandpass filters 45$b$–45$d$. The A signal being in the shared bandwidth does not have to be frequency converted.

In the example, shared bandwidth signals on four coaxial cables 11 were frequency stacked. In the general case, n such signals can be stacked. In such case, n–1 of the shared band RF signals are up converted to generate the stacked frequency RF signal together with the nth shared band RF signal which remains in the shared band. Thus, the frequency stacked RF signal has the n RF signals stacked in n frequency bands. In de-stacking, the n–1 signals are down converted to the shared common frequency band.

As previously discussed, the invention includes the generation of a common base or reference local oscillator signal which is used for both up conversion and down conversion. In the present system, a 52 MHz base local oscillator signal is used. This base local oscillator signal is above the shared band of 5–42 MHz and below television channel 2 (57 MHz). It is also within the bandwidth of the broadband downstream signal (50–750 MHz) which is distributed to all of the service area nodes as described above.

The most frequency sensitive element of the traditional block converter circuit, the PLL and the reference used to generate the L.O. have been eliminated from each individual block converter in accordance with the present invention. This arrangement confines the phase noise and jitter to the low levels set by the reference or base L.0. of the system thereby optimizing the overall performance of the frequency conversion process. It also enhances the reliability through lower component count, and considerably reduces power consumption. In lieu of the traditional PLL circuits used to generate each mixer local oscillator signal in each of the three up and down converters, a single, central base local oscillator signal (BLO) generator 47 is provided in the headend 3. This BLO generator 47 includes dual 52 MHz (or other frequency) local oscillators $49_1$ and $49_2$. The use of one redundant oscillator system wide accommodates the use of an ultrastable, extremely low phase noise source to be used, since the high cost is distributed over all of the block converters in the system. Preferably, both local oscillators $49_1$ and $49_2$ are active at all times. An RF sensing switch 51 switches operation over to the second L.O. in the event of a failure of the first. Dual uninterrupted power supplies $53_1$ and $53_2$ may be included to insure operation in the event of power supply failure. A two-way power splitter 55 is used to provide dual outputs of the selected base local oscillator signal B.L.O.1 or B.L.O.2. One of the outputs of the B.L.O. signal is injected into the downstream signal path at the headend, and transmitted over the Cable/HFC network 7 together with the broadband 50–750 MHz downstream signals. This signal loops through each of the service area nodes 5 where it is extracted from the broadband signal for use in regenerating the appropriate local oscillator signals needed for up conversion. The second output of the power splitter 55 is used as the base local oscillator signal for the block frequency down converters in the down conversion system 35 in the headend.

As shown in FIG. 2, the headend 3 also includes distribution equipment 57 for TV signals, data, digital signals and such which are combined into the broadband 50–750 MHz signal transmitted over the HFC transport system 7 to the service area nodes 5.

Figure 3:
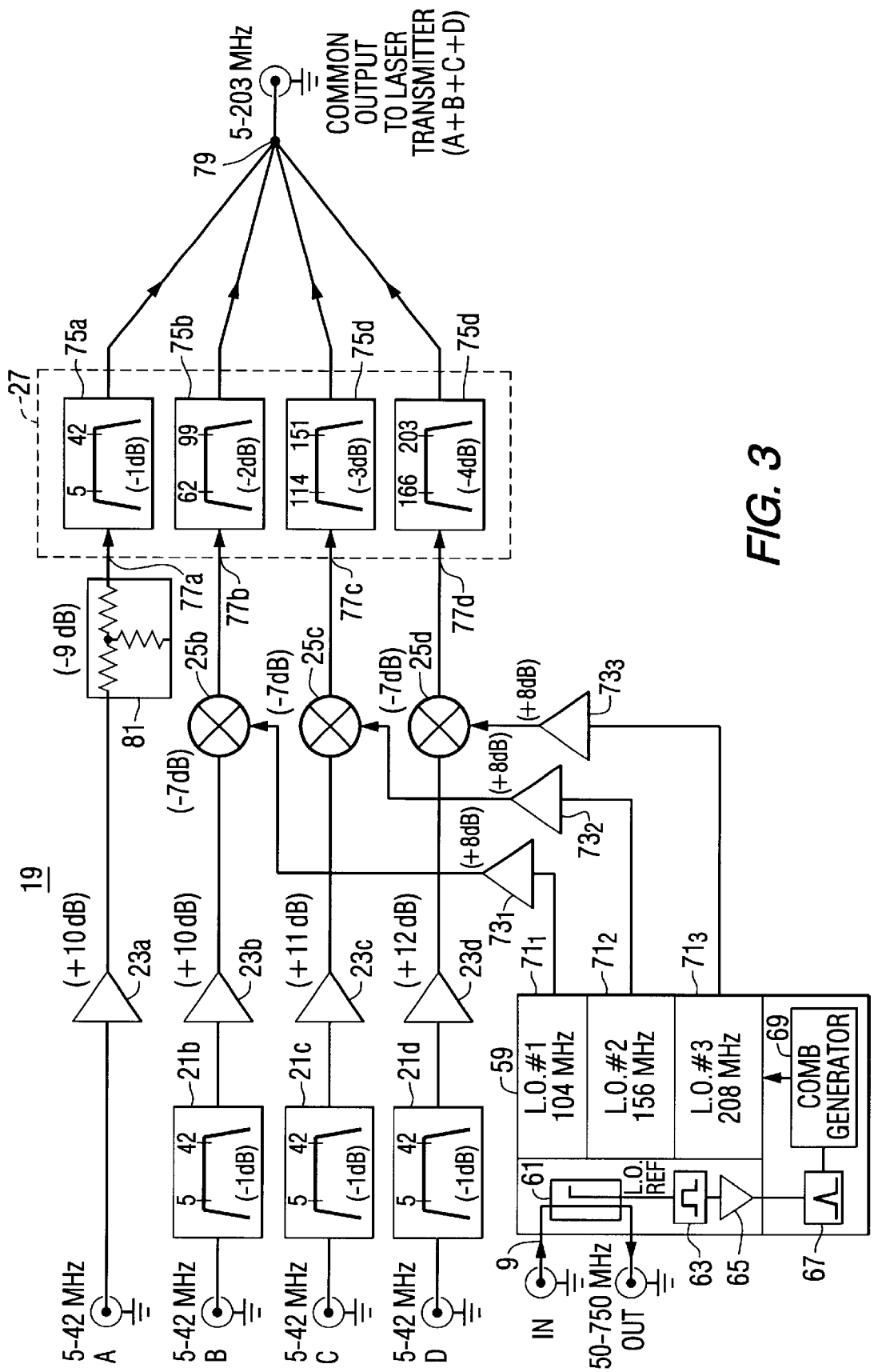
FIG. 3 is a schematic diagram illustrating the details of the up conversion (stacking) system which forms a part of the system of FIG. 2.

FIG. 3 illustrates more of the details of the up conversion system 19. The heart of the system is the extraction and L.O. regeneration module 59 which generates the local oscillator signals used to frequency shift the shared bandwidth signals B–D. This module includes a coupler 61 which samples the 50–750 MHz broadband downstream signal containing the 52 MHz base local oscillator signal. This broadband signal is passed through an input bandpass limiting filter 63 having a pass band such as from about 50–54 MHz and is centered about the 52 MHz base local oscillator signal which eliminates most of the broadband signal from the amplifier input. The 52 MHz signal is then amplified in a high gain amplifier 65 for input to a saw filter 67 tuned to 52 MHz. The base local oscillator signal is thereby extracted from the 50–750 MHz broadband downstream signal. The 50–750 MHz broadband signal continues to the output of the module. This base local oscillator signal is then used to generate the required local oscillator signals for the mixers used to frequency shift the shared bandwidth signals B–D. In the preferred embodiment of the invention, this is accomplished through the use of a comb generator 69 which digitally generates the harmonics of the base local oscillator signal. The second through fourth harmonics are passed through a 104 MHz, 156 MHz and 208 MHz bandpass filter $71_1$–$71_3$, respectively, and are amplified by the amplifiers $73_1$–$73_3$, respectively, to the signal level required for optimum operation of the mixers. The mixer 25b uses the L.O.#1 signal to shift the 5–42 MHz B signal to a 62–99 MHz band by using the inverted output. Similarly, the 156 MHz signal L.O.#2 is used by the mixer 25c to generate an inverted output which shifts the 5–42 MHz C signal to the 114–151 band, and the 208 MHz L.O.#3 is used by the mixer 25d to produce an inverted output in which the 5–42 MHz signal D is shifted to the 166 to 203 MHz band. Each of the frequency shifted signals B–D is passed through a filter section 75b–75d of the quadraplexer 27. As discussed, the A 5–42 MHz signal is not frequency shifted, but is passed through a corresponding filter 75a in the quadraplexer.

Unlike traditional block conversion circuits where individual filters are used and their outputs are summed by a combiner with the consequential 7 dB loss, the up conversion system 19 uses four filters 75a–75d in a quadraplexer configuration, having four separate inputs 77a–77d and a common output 79. This is a very technically difficult and challenging problem whether realized in a coaxial or a transmission line circuit since each of the inputs must be matched over the specified band so that each of the filters operate as required, even with all four filters having a common output. Since the four output bands are frequency multiplexed, the four individual filter outputs can be connected together to form the common output 79 providing that the filters are critically designed, laid out and tuned to meet all the requisite specifications for working as a quadraplexer, and each mixer is driving into a matched, low loss filter over the respective B–D band with the output matched for the combined frequency band. This novel use of advanced design techniques reduces the loss of the output filter combiner path used in traditional up converters by at least 7 dB (the loss of a combiner) or more, depending on the comparative loss of individual filters used by other systems. This reduction in loss equates linerally (dB for dB) with improving the most critical measure of system performance, Carrier to Noise (C/N) ratio of the total signal path, since any line loss (dB) ahead of system input equates to added noise figure (NF), and increased NF adds linerally to C/N. In addition, by not algebraically summing the four inputs, as is done in traditional systems, but instead, using four individual frequency multiplexed bands, the C/N is further improved by 6 dB (gaussian noise is not the sum of the noise in the four signals, or four times the noise of each input, which is a 6 dB improvement).

The up conversion system 19 is further designed to maintain the relative signal levels of the four shared band signals A–D. To this end, an amplifier 23a is inserted in the A signal path followed by an impedance matching and attenuation pad 81. This impedance pad 81 can be a T arrangement as shown or a Pi arrangement (not shown) as is well known. The gains and losses of the components in each of the signal paths through the up conversion system 19 are shown on FIG. 3. As indicated, the 5–42 MHz filters 75a and 21b–21d typically introduce a one dB loss. As is known, the higher frequency filters inject increasingly higher losses so that the filters 75b–75d typically introduce, 2, 3 and 4 dB of loss, respectively. Each of the mixers 25b–25d typically introduces 7 dB of loss. To accommodate for these variations in loss in the individual branches of the up conversion system, the gains of the amplifiers 23b–23d are selected to add 10, 11 and 12 dB, respectively, of gain so that the resultant signal loss in each branch is 0 dB.

As can be seen from observing the pass bands of the filters 75a–75d, use of the second, third and fourth harmonic of the 52 MHz base local oscillator signal provides a 20 MHz guardband between the 5–42 MHz band and the 62–99 MHz band, providing for additional out of band rejection of unwanted signals. Thus, the 52 MHz base local oscillator signal is 10 MHz away from both of these frequency bands. In one alternative arrangement, the 52 MHz base local oscillator signal can be used as L.O.#1 applied to the mixer 25b with the second harmonic 104 MHz applied to the mixer 25c as L.O.#2 and the third harmonic 156 MHz applied to the mixer 25d as L.O.#3. In this case, the outputs of the mixers are not inverted and shift the signals B–D to 57–94, 109–146, and 161–198 MHz. As can be appreciated, this produces a narrower guard band of only 15 MHz between the lower two bands and provides only 5 MHz between the 52 MHz base local oscillator signal and the second band. Other patterns of frequency up conversion can be used to generate the frequency stacked RF signal produced by the up conversion system 19. In such case, other methods (such as frequency multipliers) of the types which maintain stability and produce low phase noise could be used to generate the required local oscillator signals for the mixers. Of course, as noted, it is preferred that multipliers using PLLs be avoided. The preferred system of using a comb generator to generate harmonics of the base local oscillator signal also minimizes phase noise and phase noise degradation.

Figure 4:
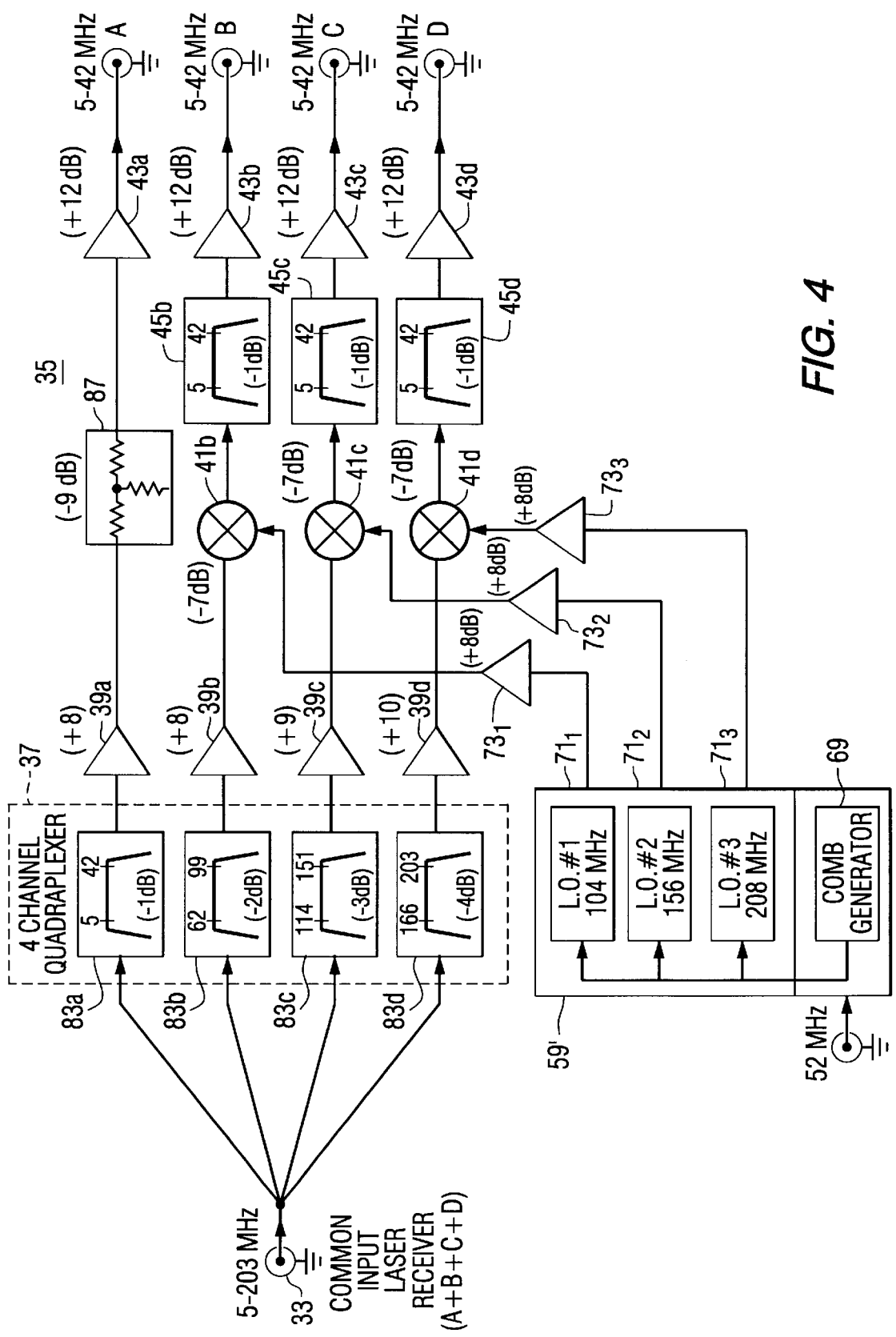
FIG. 4 is a schematic diagram illustrating the details of the down conversion (destacking) system which forms a part of the system of FIG. 2.

FIG. 4 illustrates the details of the down conversion system 35 located in the headend. A local oscillator module 59' receives the 52 MHz base local oscillator signal directly from the BLO generator 47 which is also located in the headend. This signal is applied with or without amplification or attenuation as required (not shown) to the comb generator 69 which, as previously discussed, generates harmonics of the 52 MHz base local oscillator signal. The down converters must use the same local oscillator signals as the up conversion system in order to convert the stacked shared band signals back to the common shared band. Hence, filters $71_1$–$71_3$ generate L.O.#1, L.O.#2, and L.O.#3 local oscillator signals at 104 MHz, 156 MHz and 208 MHz, respectively. These local oscillator signals are amplified in the amplifiers $73_1$–$73_3$, respectively, for application to the mixers 41b–41d. The frequency stacked RF signal is applied to the single input 33 which is directly connected without a splitter to the four channel quadraplexer 37. Filters 83a–83d extract the separate bands from the 5–203 MHz frequency stacked RF signal. Each of these bands is amplified in an amplifier 39a–39d. The outputs of the amplifiers 39b–39d are applied to the mixers 41b–41d which utilizes the local oscillator signals L.O.#1-L.O.#3 to down convert the respective bands to the 5–42 MHz shared band. Again, the inverted output of the mixers are used in the exemplary system. The outputs of the mixers are passed through shared band filters 45b–45d and amplified in the amplifiers 43b–43d to produce the shared band 5–42 MHz signals B–D. As in the case of the up converter, an impedance pad 87 matches the impedance for the shared band signal A and provides appropriate attenuation to the unconverted signal which is passed through the amplifier 43a. Again, the gains/losses through all of the branches of the down conversion system are matched. As indicated by the component-by-component values shown in FIG. 4, the gain through each branch is 10 dB.

As in the case of the up conversion system, different local oscillator signals and means for generating them can be used in the down conversion system. However, the local oscillator signals used in the two systems must be the same to generate outputs in the shared band. Thus, if the up conversion system amplifies the base local oscillator signal and the second and third harmonics to the mixers and uses their uninverted outputs, the down condition system can do the same.

Through the reduction in component count (75% less), reduction in power consumption (12 W max for quad block down converter) and the novel integration of four output filters and a four-way combiner or a splitter and 4 input filters into a single quadraplexer module, thus eliminating the mandatory, lossy four-way combiner or splitter, system performance and reliability are greatly enhanced and size is reduced making it feasible to retrofit existing Cable/HFC systems for advanced interactive services.

The use of one redundant ultra-stable oscillator throughout the system and locating it in the headend (controlled environment) vastly improves frequency stability over very large operating temperature ranges (up to 25° C. above ambient which can be as high as 85° C. within the node enclosure). By using the same L.O. frequency source for all the block converters in the system, frequency shifts, frequency errors and variations over time and temperature which typically occur between multiple, individual frequency sensitive components are eliminated. This ensures that each individual converter stays locked on frequency, and eliminates performance degradation caused by filter pass band shifting which may cause increased bandpass losses (and group delay variations), and reduce out of band rejection of unwanted signals. By eliminating individual PLL's in each converter circuit, the overall phase noise and phase jitter of the system can be maintained at levels very close to the phase noise performance of the redundant base reference oscillator, which can be ultra low noise, since only one is used per system. By regenerating the original L.O., rather than using a common reference to generate L.O.'s in each up and down converter using local PLL loops, the signal stability and purity of the ultra-stable L.O. is maintained with nominal degradation. By using comb line generator techniques to generate second, third and fourth harmonic L.O.'s for bands B, C, and D, the advantage of improved C/N is maintained regardless of the number of block up converters and down converters used in the system. By using single conversion, only one mixer is required for each converter module. Since each mixer adds 3 dB to the noise level of the signal path, and therefore can potentially degrade C/N performance by 3 dB depending upon its location in the signal path, minimizing the overall number of mixers used in the system minimizes this noise contribution.

Figure 5:
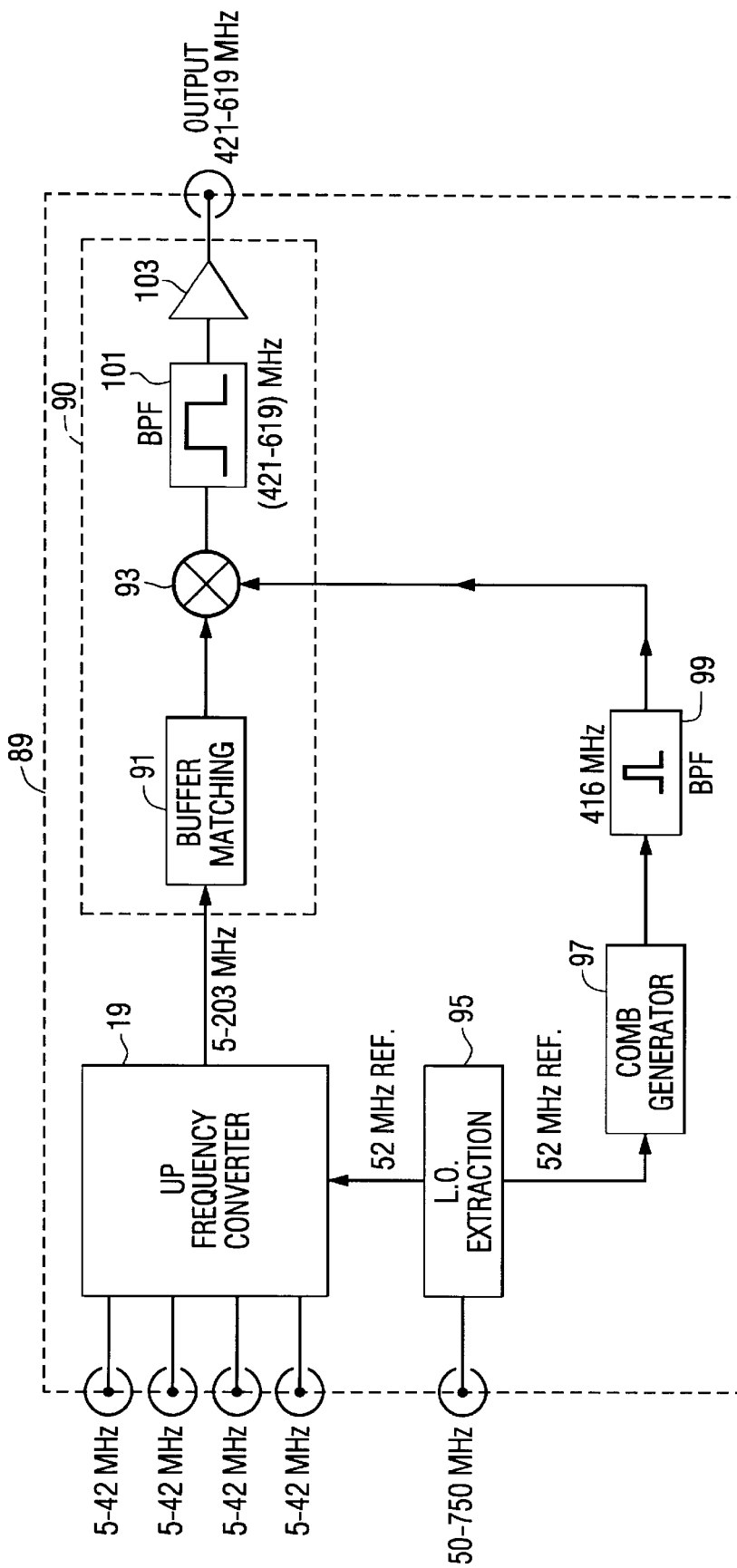
FIG. 5 is a schematic diagram of apparatus for multiple frequency stacking a number of frequency stacked RF signals in accordance with another aspect of the invention.

FIG. 5 illustrates another embodiment of the invention in which a frequency stacked RF signal is shifted to another frequency band. This would be used for instance to shift the frequency stacked signal to an available frequency band in the system. It also could be used to shift the frequency stacked signal to an optimum frequency band for driving a laser in an HFC system. As discussed below in connection with FIGS. 7 and 8, it could also be used in a system which provides multiple stages of frequency stacking, i.e., in which frequency stacked signals are themselves frequency stacked. As shown in FIG. 5, the up converter system 89 includes an up frequency converter 19 which frequency stacks a number, such as 4, shared bandwidth signals such as the 5–42 MHz signals shown. This up frequency converter is similar to that shown in FIG. 3 and outputs a 5–203 MHz frequency stacked signal which is passed through an amplifier 91 for buffer matching for input to a mixer 93. The local oscillator signal for the mixer 93 is generated from the 52 MHz base local oscillator signal which is extracted from the 50–750 MHz downstream signal by the local oscillator extraction circuit 95. This 52 MHz base local oscillator signal is provided to the up frequency converter 19 which uses it to generate its local oscillator signals, and is also applied to a comb generator 97. The comb generator 97 generates the local oscillator signal, which in this case is 416 MHz from harmonics of the 52 MHz signal. This 416 MHz signal is shaped in the bandpass filter 99 before being applied to the mixer 93. The mixer 93 shifts the 5–203 MHz signal to a signal in the 421–619 frequency band. This signal is then passed through the bandpass filter 101 tuned to this band and is amplified in an amplifier 103 if necessary.

In the systems described to this point, each service area node serves for instance 2,000 homes or subscribers. These 2,000 homes are divided into groups of 500 each. The 500 homes are connected to the associated service area node through a common coaxial cable and share a common bandwidth. As mentioned, in the United States this is 5–42 MHz, while in Europe it is 5–65 MHz. Other shared bandwidths obviously could be used, however, the 5–42 MHz bandwidth will be used in the following examples. In densely populated areas, it is desirable to take further advantage of the bandwidth available in the cable system for two-way transmission. Hence, in accordance with another aspect of the invention, the frequency stacked RF return signals R from groups of 2,000 subscribers are further frequency stacked to generate multiple frequency stacked return signals $R^2$.

Figure 6:
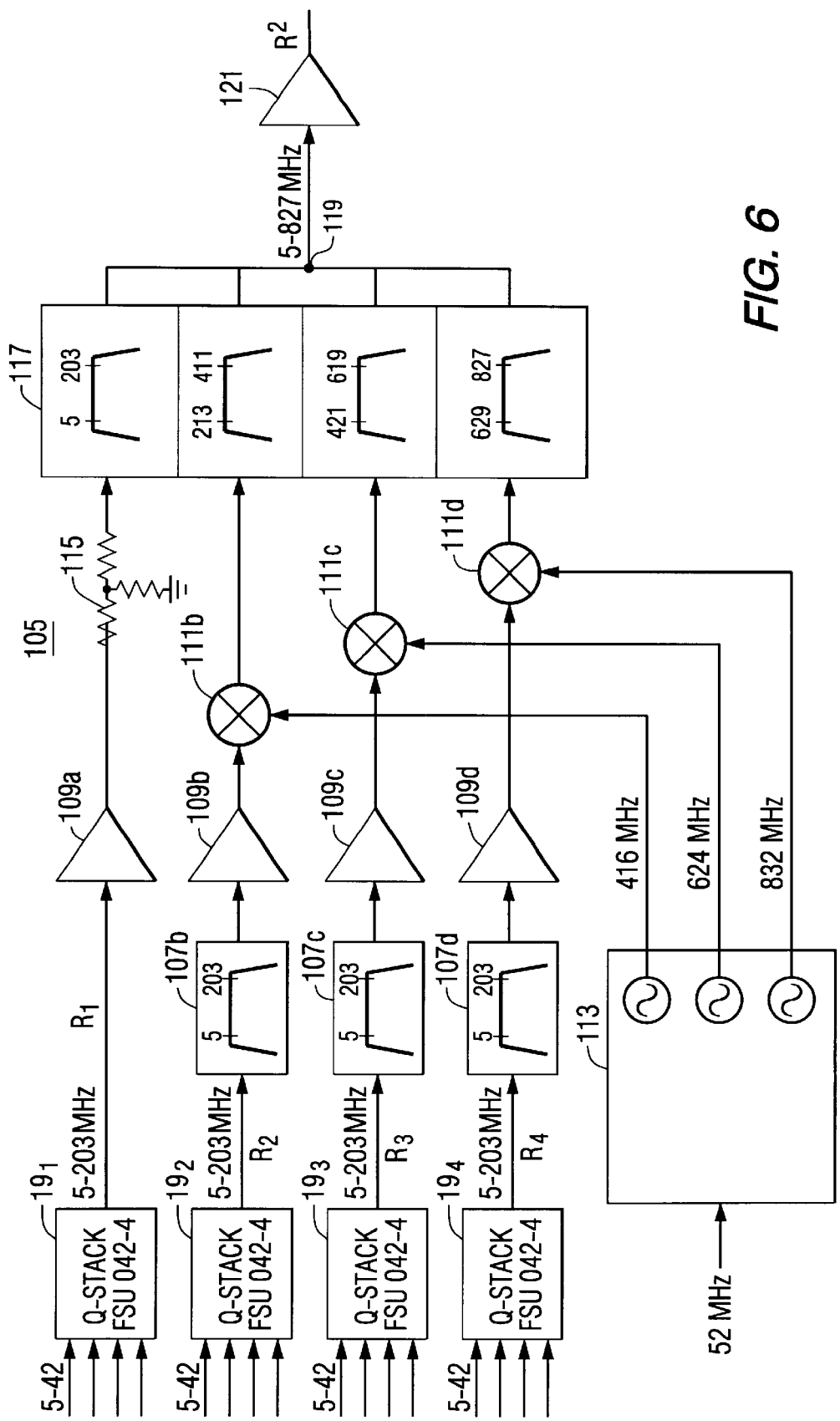
FIG. 6 illustrates an arrangement of the modules of the multiple frequency stacking apparatus shown schematically in FIG. 5.

FIG. 6 illustrates schematically a multiple frequency up conversion system 105. This system includes four of the up conversion systems 19 illustrated in FIG. 3. Each of these up conversion systems $19_1$–$19_4$ frequency stacks four of the 5–42 MHz signals from each group of 500 homes into a 5–203 MHz frequency stacked RF return signal $R_1$–$R_4$. Three of these signals, $R_2$–$R_4$ are separately frequency shifted in a similar manner to the 5–42 MHz signals by first passing them through 5–203 MHz bandpass filters 107b–107d and then applying them to amplifiers 109b–109d to raise them to the required input levels of mixers 111b–111d. Local oscillator signals for the mixers 111b–111d are regenerated from the 52 MHz base local oscillator signal in the service area node local oscillator signal generator 113. As in the case of the up converters 19, the local oscillator signal generator 113 includes a comb generator (not shown) which generates the local oscillator signals as harmonics of the 52 MHz common base local oscillator signal. In the example, the local oscillator signals are harmonics of 208 MHz which in turn is the fourth harmonic of the 52 MHz system wide base local oscillator signal. The second, third and fourth harmonics of the 208 MHz signal or 416, 624 MHz and 832 MHz, respectively are used. The 416 MHz local oscillator signal is applied to the mixer 111b to convert the 5–203 MHz signal $R_2$ to a 213–411 MHz signal. In a similar manner, the mixer 111c uses the 624 MHz local oscillator signal to convert the signal $R_3$ to a 421–619 MHz signal and the mixer 111d converts the signal $R_4$ to a 629–827 MHz signal using the 832 MHz local oscillator signal. The inverted outputs of each of the mixers 111b–111d are used in this example. Alternatively, non-inverted mixer outputs could be used. In addition, the frequency stacked RF signals $R_2$–$R_4$ could be shifted to other frequency bands, preferably using local oscillator frequencies derivable from the base local oscillator frequency of the system.

The 5–203 MHz signal $R_1$ is not frequency shifted but is passed through an amplifier 109a and an impedance matching pad 115 for input to the first stage of a quadraplexer 117 which is a 5–203 MHz bandpass filter. The quadraplexer 117 further includes bandpass filters for the other frequency shifted signals $R_2$–$R_4$. As previously described, the four frequency bands are applied to a common node 119 which produces the multiple frequency stacked return signal $R^2$ without the need for a combiner. An output amplifier 121 may or may not be required, depending on the type of laser used to transmit the signal $R^2$ to the headend and the allowable losses. If the amplifier 121 is used, it should preferably be a multicarrier, low distortion type due to the large number of carriers which could be present at the output.

Figure 7:
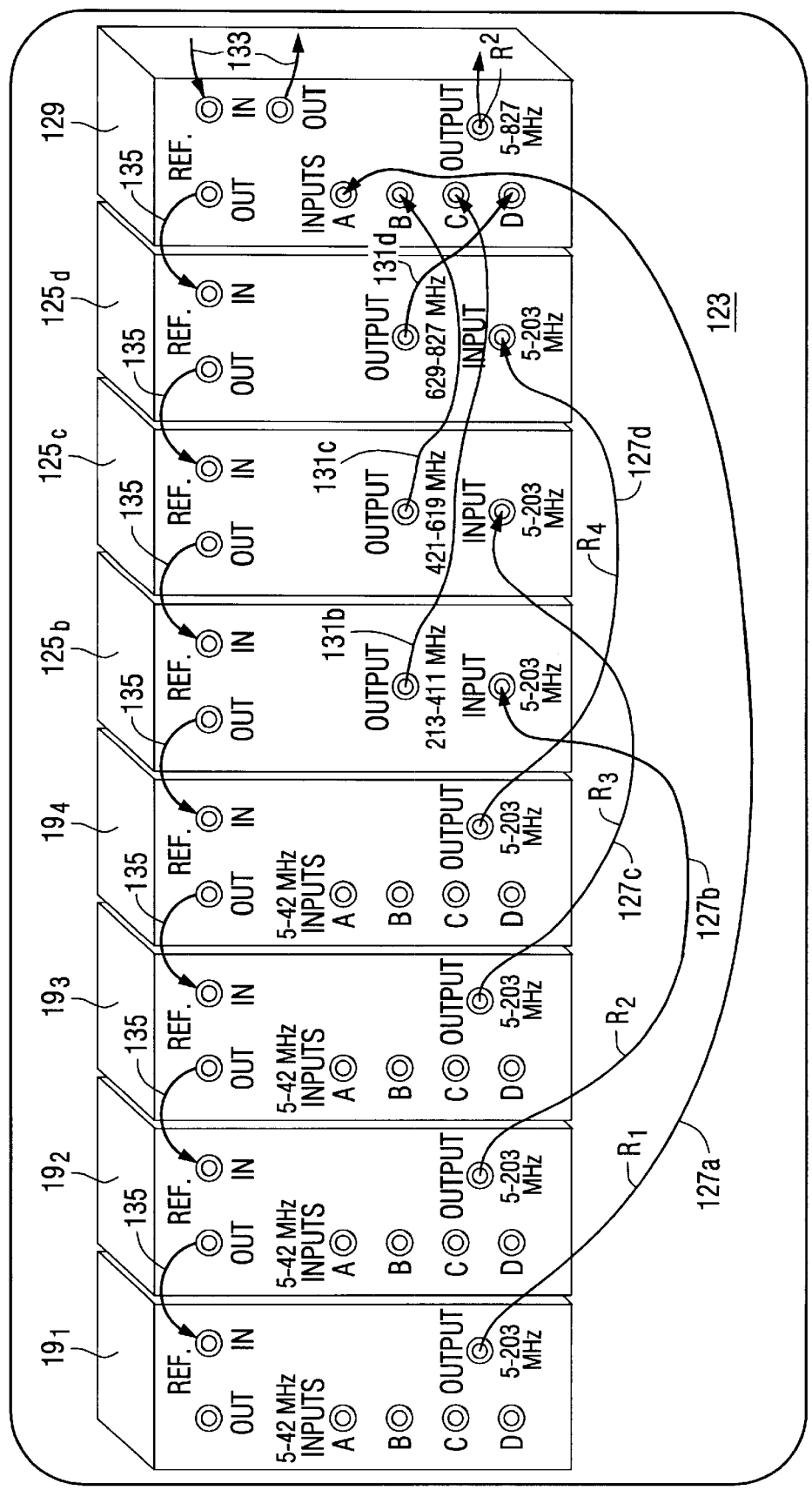
FIG. 7 illustrates an arrangement of the modules of multiple frequency destacking apparatus which extracts the shared bandwidth signals up converted by the apparatus of FIG. 7.

FIG. 7 illustrates a modular construction of one possible version of an up conversion system 123 for multistage frequency stacking. Each of the up conversion systems $19_1$–$19_4$ is contained in a separate module having four inputs each of which receives one of the 5–42 MHz shared band signals A–D. The 5–203 MHz frequency stacked signal $R_2$ generated in the up frequency converter $19_2$ is applied through a coaxial cable connection 127b to the input of a module 125b that contains an up converter similar to the converter section 90 in FIG. 5. The signal $R_2$ is shifted to the 213–411 MHz frequency band in the module 125b using a 208 MHz local oscillator signal applied to a mixer and a 213–411 MHz bandpass filter, and is then passed to an organizer module 129 through coaxial cable 131b. Similarly, the frequency stacked signal $R_3$ generated by the up frequency converter $19_3$ is applied to the input of a module 125c through coaxial cable 127c where it is shifted to the 421–619 MHz frequency band using a 416 MHz local oscillator signal and a 421–619 MHz bandpass filter. The 421–619 MHz signal is applied to another of the inputs to the module 129 through coaxial cable 131c. Likewise, the 5–203 signal $R_4$ from the up conversion module $19_4$ is input through coaxial cable 127d to the module 125d which converts it to the 629–827 MHz signal using a 624 MHz local oscillator signal in a mixer and then passing it through a 629–827 MHz bandpass filter. The 629–827 MHz signal is applied to another input of the module 129 through coaxial cable 131d. In addition, the $R_1$ signal from the module $19_1$ is applied directly to the final input of the module 129 through the coaxial cable 127a. The organizer module 111 balances the signals in the 5–203, 213–411, 421–619 and 629–827 MHz bands received from the modules $19_1$, and 125b–125d, respectively and combines them into a 5–827 multiple frequency stacked signal $R^2$ for transmission to the headend 3. The 50–750 MHz downstream signal is looped through the organizer module 129 by the coaxial cables 133. The 52 MHz base local oscillator signal is extracted from this broadband downstream signal in the module 129 and looped through the modules 125b–125d and $19_4$–$19_1$ using connecting coaxial cables 135. Each of the modules then generates the local oscillator signals required in a manner discussed previously. Alternatively, the modules 125b–125d and 129 can be replaced by a single module containing an up converter such as the converter 105 in FIG. 6 which incorporates a quadraplexer and eliminates the need for a combiner to generate the 5–827 MHz signal $R^2$.

Figure 8:
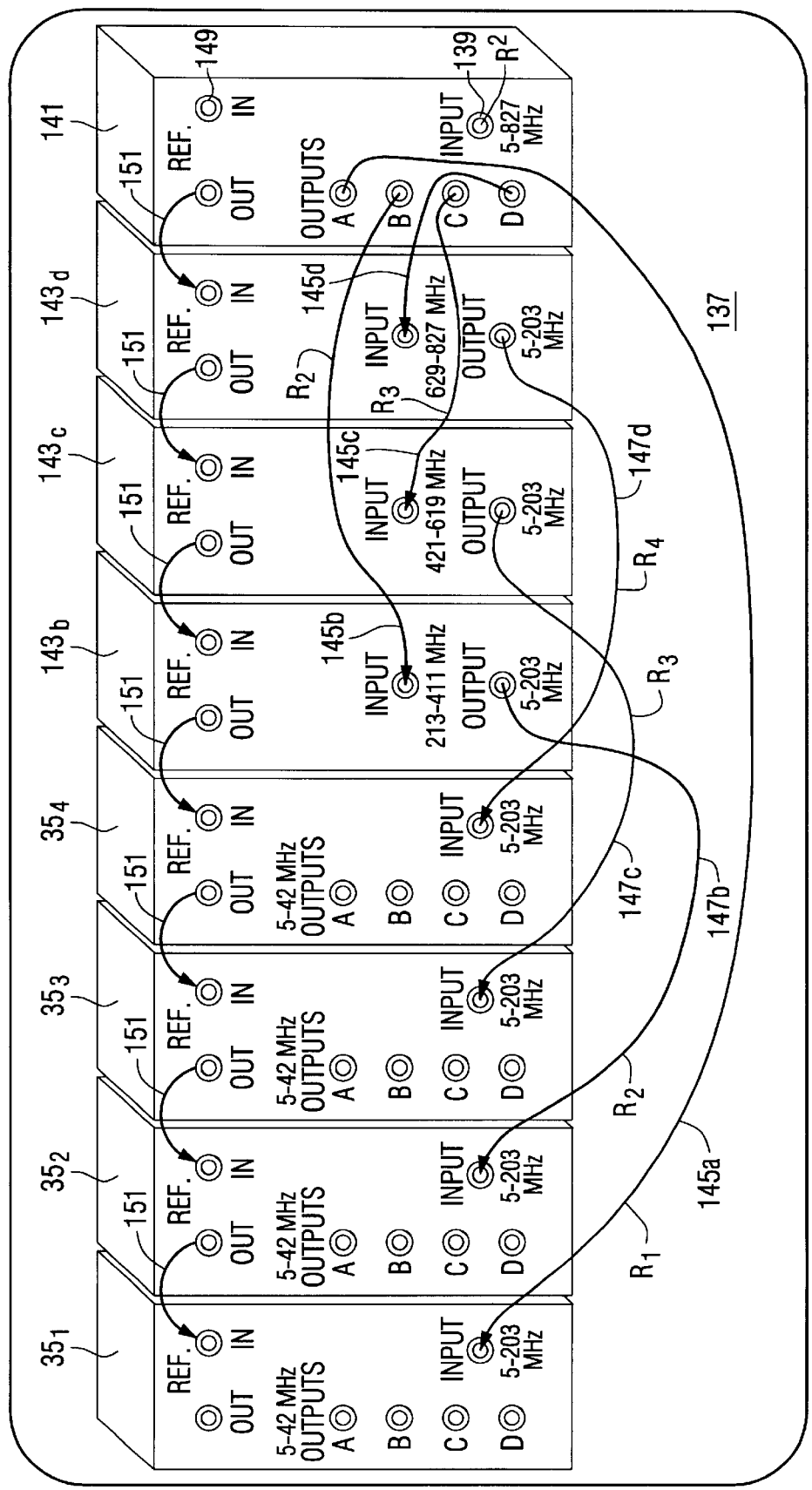
FIG. 8 is a schematic diagram illustrating apparatus for block up conversion of a frequency stacked RF signal in accordance with another aspect of the invention.

FIG. 8 illustrates the multistage frequency destacker 137 located in the headend which receives the multiple frequency stacked upstream signal $R^2$ through the input 139 in module 141. This module 141 includes a quadraplexer which extracts the frequency stacked RF signals $R_1$–$R_4$ from the multiple frequency stacked signal $R^2$. The 213–411 MHz signal $R_2$ is applied to the input of a module 143b through a coaxial cable 145b. The module 143b includes a mixer which shifts the 213–411 MHz signal to a signal in the 5–203 MHz band which is applied to the down converter system $35_2$ through coaxial cable 147b. The 421–619 MHz signal from the module 121 is applied through the coaxial cable 145c to the module 143c which shifts it to a 5–203 MHz signal applied to the additional frequency down converter $35_3$ through coaxial cable 147c. Similarly, the 629–827 MHz signal is applied to the module 143d through coaxial cable 145d where it is shifted to the 5–203 MHz frequency band and applied to the additional down frequency converter $35_4$ through the coaxial cable 147d. The 5–203 MHz signal $R_1$ from the module 141 is applied directly to the further down converter $35_1$ through the cable 145a.

Each of the down converters $35_1$–$35_4$ extracts four 5–42 MHz subscriber signals from each of the 5–203 MHz frequency stacked signals. The 52 MHz based local oscillator signal is applied to the module 141 through the input 149 and is passed to the additional modules through the coaxial cables 151.

Figure 9:
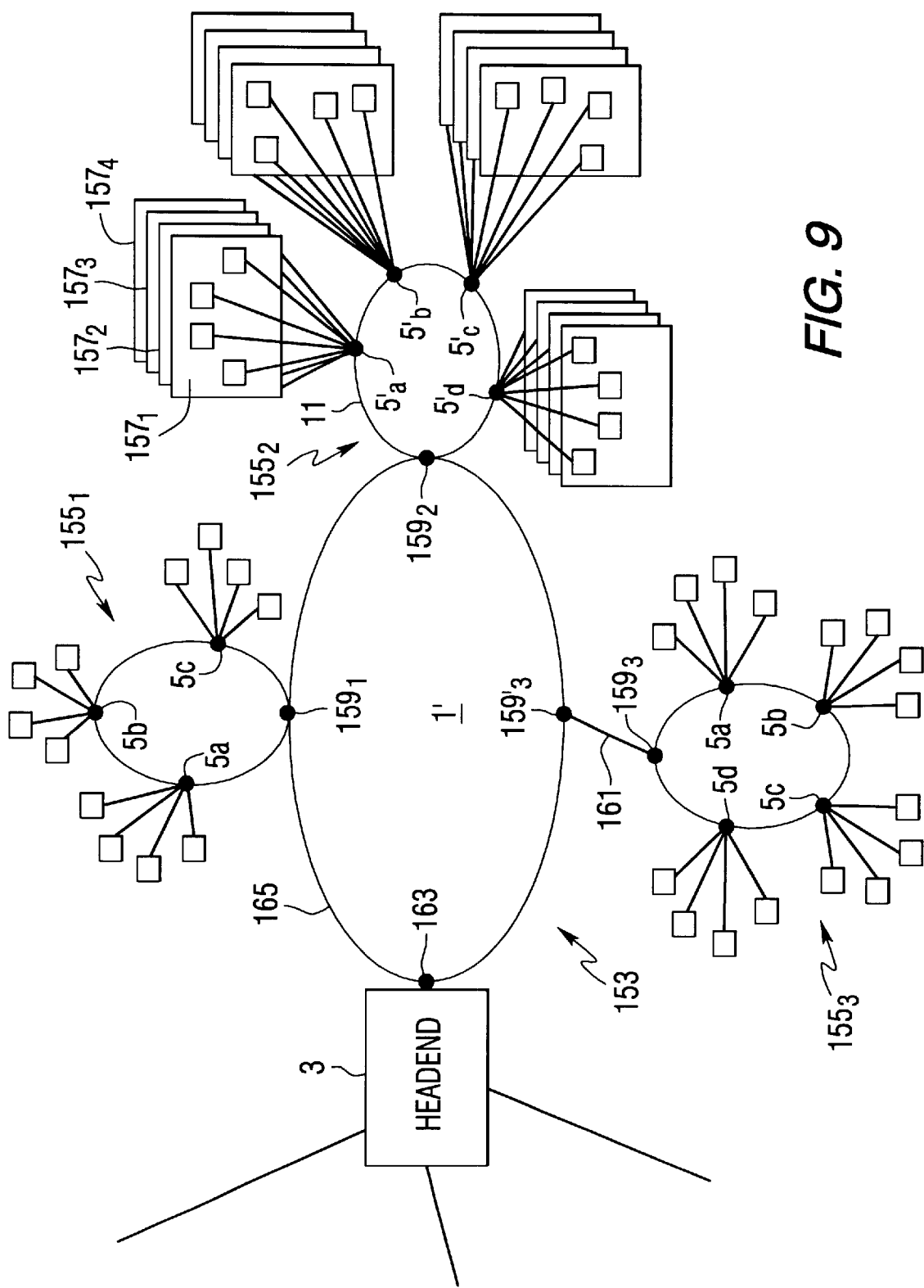
FIG. 9 is a schematic diagram illustrating an HFC system having a primary fiber ring and secondary fiber rings which can utilize the multiple frequency stacking and destacking apparatus of FIGS. 5–7.

FIG. 9 illustrates a complex HFC two-way system 1' which includes a primary ring 153 with a number of secondary rings $155_1$–$155_3$. In the ring $155_2$ each of the service area nodes 5'a–5'd serves four sets of 2,000 home groups $157_1$–$157_4$. As previously described, each group of 2,000 homes has four subgroups of 500 homes each sharing a 5–42 MHz return signal which feeds into the node 5' through a common coaxial cable. The nodes 5'a–5'd in FIG. 9 incorporate the multiple stage up frequency converter such as shown in FIGS. 5 and 6 which produces the 5–827 multiple frequency stacked return signal $R^2$. These service area nodes 5'a–5'd use the multiple frequency stacked RF signal to modulate a laser which transmits the signal to a hub $159_2$ on the primary ring 153. Separate optic fibers 11 can be used to transmit the four 5–827 MHz signals from the nodes 5'a–5'd to the hub $159_2$ or these broadband signals can be used to modulate lasers of different wavelengths (color bands) which can all be transmitted on a single optic fiber 11 to the hub $159_2$. Various system configurations are possible. For instance, as shown in FIG. 9, the secondary ring $155_3$ can be remote from the primary ring with its hub $159_3$ communicating with a hub $159'_3$ on the primary ring through optical fibers 161. The single or multiple frequency stacked signals from all of the secondary rings $155_1$–$155_3$ are all transmitted by their associated hub $159_1$–$159'_3$ to the headend optical receivers 163 where the optical signals are converted to RF signals for extraction in the headend 3. As in the case of the secondary rings, the primary ring can have different optic fibers for the return signals from each satellite ring or modulate signals of different wavelengths (color bands) which are then returned on a common optic fiber 165 to the headend hub 163.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. RF block conversion apparatus for processing n shared band RF signals in a broadband two-way communication system, said apparatus comprising:

n signal inputs;

means for receiving a signal of a selected RF frequency for use as a base local oscillator signal;

means for generating from said base local oscillator signal, n–1 local oscillator signals, each of a different RF frequency;

n–1 mixers for up/down frequency conversion of n–1 of said n shared band RF signals between said shared band and n–1 different frequency bands, to each of which mixers one of said n–1 local oscillator signals is applied, to convert between one of said shared band RF signals and one of said n–1 different frequency bands, each mixer connected to a signal input such that there is one signal input that is not connected to a mixer; and n bandpass filters including n–1 bandpass filters for each of said n–1 different frequency bands, each of said n–1 bandpass filters connected to one of said mixers and one bandpass filter connected to the signal input that is not connected to a mixer, all n of said bandpass filters being connected to a common node at which a frequency stacked RF signal having said n RF signals stacked in n frequency bands is present, said bandpass filters not being connected to a combiner or a splitter.

2. The RF block conversion apparatus of claim 1 wherein n equals at least 2.

3. The RF block frequency conversion apparatus of claim 2 where n is equal to 4 and said bandpass filters comprise a four channel quadraplexer filter.

4. The RF block frequency conversion apparatus of claim 1 wherein said mixers generate inverted outputs used as said n–1 bands.

5. The RF block frequency conversion apparatus of claim 1 wherein said n–1 local oscillator signals are harmonics of said base local oscillator signal.

6. The RF block frequency conversion apparatus of claim 5 wherein said means generating said harmonics of said base local oscillator signal comprises a comb generator.

7. The RF block frequency conversion apparatus of claim 1 wherein said apparatus acts as a frequency stacker, further comprising n–1 shared band bandpass filters to which n–1 of said n shared band RF signals are applied, each of said n–1 shared band bandpass filters having an output coupled to an input of one of said mixers.

8. The RF block frequency conversion apparatus of claim 7 wherein said mixer means includes multicarrier amplifiers between said shared band additional bandpass filters and said mixers.

9. The RF block frequency conversion apparatus of claim 8 including an impedance matching pad coupled to an input of one bandpass filter.

10. An RF block conversion apparatus for processing an input RF signal formed by combining n RF signals each of said RF signals being within a frequency band distinct from a frequency band of all other RF signals that were combined to form said input RF signal, said apparatus comprising:

a signal input for receiving said input signal, n bandpass filters each having an input connected to the signal input and an output, all bandpass filters having a bandwidth such that the bandwidth of each filter corresponds to a bandwidth of one of the signals from which the input signal was formed, n–1 mixers, each mixer connected to an output of one of the n bandpass filters, such that there in one bandpass filter not connected to a mixer, wherein each of the bandpass filters has a bandwidth that does not overlap a bandwidth of any of the other bandpass filters; and means for generating n–1 oscillator signals, each of a different RF frequency and connected to the mixers such that each mixer receives a different one of the n–1 oscillator signals and converts a signal from the bandpass filter to which the mixer is connected.

11. The RF block frequency conversion apparatus of claim 10 including multicarrier amplifiers before and after said mixers.

12. The RF block frequency conversion apparatus of claim 11 including an impedance matching pad coupled to the output of said one bandpass filter not connected to a mixer.

13. A broadband two-way communication system comprising:

a headend;

at least one service area node;

a two-way transmission system connecting said at least one service area node with said headend for simultaneous two-way communication, said service area node comprising n branches each carrying a shared bandwidth RF subscriber signal and an up conversion system frequency stacking all of said shared bandwidth RF subscriber signals into a frequency stacking all of said shared bandwidth RF subscriber signal in which said n shared bandwidth RF subscriber signals are incorporated into n separate frequency bands, said frequency stacked RF return signal being transmitted over said two-way transmission system to said headend, said up conversion system including up converters using local oscillator signals to generate said separate frequency bands, and up converter local oscillator means generating said local oscillator signals for up conversion from a base local oscillator signal transmitted from said headend over said two-way transmission system, said headend having means generating a broadband downstream signal which is transmitted over said two-way transmission system to said at least one service area node which distributes said broadband RF downstream signal over each of said n branches, said headend also having a down conversion system for extracting said shared bandwidth RF subscriber signals from said frequency stacked RF return signals as separate signals, said down conversion system comprising bandpass filter means extracting each of said n separate frequency bands from said frequency stacked RF return signal, down converters using n–1 local oscillator signals to extract said shared bandwidth RF subscriber signals from said separate frequency bands, down converter local oscillator means generating said local oscillator signals for down conversion from said base local oscillator signal; and oscillator means, located at said headend, for generating said base local oscillator signal.

14. The system of claim 13 comprising a plurality of said service area nodes and wherein said base local oscillator signal is transmitted to each of said plurality of service area nodes over said two-way transmission system.

15. The system of claim 13 wherein said two-way transmission system comprises an optical fiber system, each of said branches comprises a coaxial cable, said service area node includes electro/optic conversion means modulating a carrier light beam on said optical fiber system with said frequency stacked RF return signal for transmission to said headend, and said headend comprises optic/electric conversion means demodulating said carrier light beam and extracting said frequency stacked RF return signal for destacking by said down conversion system.

16. The system of claim 15 wherein said optical fiber system comprises first optic fiber means for transmitting said broadband RF downstream signal, and second optic fiber means for transmitting said frequency stacked RF return signal, said base local oscillator signal being incorporated into said broadband downstream signal and said up converter local oscillator means comprising means extracting said base local oscillator signal from said broadband downstream signal.

17. The system of claim 16 wherein said local oscillator means includes means for generating additional local oscillator signals as harmonics of said base local oscillator signal.

18. The system of claim 17 wherein said means for generating said harmonics of said base local oscillator signal comprises a comb generator and local oscillator filters.

19. The system of claim 16 comprising a plurality of said service area nodes each generating a frequency stacked RF return signal, wherein said second optic fiber means transmits said frequency stacked RF return signals from said plurality of service area nodes to said headend and wherein said headend includes a down conversion system for extracting said shared bandwidth signals as separate RF subscriber signals from each of said frequency stacked RF return signals.

20. RF block conversion means for processing n shared band RF signals, said apparatus comprising:
  means for receiving a signal of a selected RF frequency for use as a base local oscillator signal;
  means for generating from said base local oscillator signal, n−1 local oscillator signals, each of a different RF frequency;
  n−1 mixers to each of which one of said n−1 local oscillator signals is applied to convert between one of said shared band RF signals and n−1 different frequency bands; and
  n bandpass filters including n−1 bandpass filters for each of said n−1 different frequency bands converted to said mixer means and one bandpass filter for said shared band, all n of said bandpass filters being connected to a common node at which a frequency stacked RF signal having said n RF signals stacked in n frequency bands is present.

21. The RF block frequency conversion means of claim 20 wherein n−1 local oscillator signals are harmonics of said base local oscillator signal.

22. The RF block frequency conversion apparatus of claim 21 wherein said means generating said harmonics of said base local oscillator signal comprises a comb generator and filters for each desired local oscillator.

23. The RF block frequency conversion apparatus of claim 22 wherein said shared band is 5–42 MHz.

24. The RF block frequency conversion apparatus of claim 20 wherein n is equal to 4 and said four bandpass filters comprise a quadraplexer filter arrangement or 4 filters in quadraplexer configuration.

25. The RF block conversion apparatus of claim 22 adapted for processing m sets of said n shared band RF signals, said apparatus comprising m sets of mixer means and m sets of bandpass filters each having a common node at which a frequency stacked RF signal having n RF signals stacked in n frequency bands is present; and
  additional mixer means for up/down conversion of m−1 of said frequency stacked RF signals, said additional mixer means including means generating m−1 additional oscillator signals each of an RF frequency different from all the other oscillator signals, and m−1 additional mixers to each of which one of said m−1 additional oscillator signals is applied to convert between the n frequency bands of one of said stacked frequency RF signals and m−1 additional different frequency bands; and
  m additional bandpass filters including m−1 additional bandpass filters one for each of said m−1 additional different frequency bands connected to said additional mixer means and one additional bandpass filter for the mth frequency stacked RF signal, all m of said additional bandpass filters connected to a single node at which a multiple frequency stacked RF signal having said m frequency stacked RF signals stacked in m distinct frequency bands is present.

26. The RF block conversion apparatus of claim 25 wherein n−1 and said m−1 local oscillator signals are harmonics of said base local oscillator signal.

27. A method of broadband two-way communication between a headend and a large number of subscribers comprising:
  generating a broadband RF downstream signal at the headend;
  transmitting said broadband RF downstream signal over a two-way transmission system to a number of service area nodes;
  distributing said broadband RF downstream signal from each service area node to associated groups of subscribers over a plurality of branches between the service area node and said groups of subscribers;
  sending shared bandwidth RF subscriber signals from each group of subscribers back to the associated service area node over said branches;
  frequency stacking said shared bandwidth RF subscriber signals from said plurality of branches in each service are node into a stacked frequency RF return signal using a common base local oscillator signal transmitted from said headend to each of said local nodes via said two-way transmission system;
  transmitting said stacked frequency RF return signals from each service area node to said headend;
  frequency destacking said stacked frequency RF return signals in said headend to extract said plurality of shared bandwidth RF subscriber signals;
  generating said base local oscillator signal; and
  distributing said base local oscillator signal to said headend for said frequency destacking and to each of said plurality of subscriber units for said frequency stacking of said shared bandwidth RF subscriber signals.

28. The method of claim 27 wherein,
  said step of frequency stacking further includes frequency stacking numbers of said stacked frequency RF return signals into multiple frequency stacked RF return signals;
  said step of transmitting said stacked frequency RF return signals comprises transmitting said multiple frequency stacked RF return signals to said headend; and
  said step of frequency destacking comprising destacking said multiple frequency stacked RF return signals in said headend to extract said plurality of shared bandwidth RF subscriber signals.

29. The method of claim 28 where said step of frequency stacking numbers of said stacked frequency RF return signals into multiple frequency stacked RF return signals, and said step of destacking said double frequency stacked RF return signals employ said common base local oscillator signal.

30. The method of claim 27 wherein said step of frequency stacking further includes multiple stages of frequency stacking frequency stacked RF return signals for transmission to said headend and multiple stages of frequency destacking at said headend to extract said shared bandwidth RF subscriber signals.

31. The method of claim 30 wherein said multiple stages of frequency stacking and destacking all employ said common base local oscillator signal.

32. The method of claim 27 wherein said step of frequency stacking further comprises frequency converting a stacked frequency RF return signal from a first frequency band to a second frequency band.

33. An RF block conversion apparatus for processing n shared band RF signals in a broadband two-way communication system, said apparatus comprising:

n signal inputs, one for each of the n shared band RF signals, n−1 mixers, each mixer attached to one of the n signal inputs, at least one generator for generating n−1 oscillator signals, each of a different RF frequency and connected to the mixers such that each mixer receives a different one of the n−1 oscillator signals and converts one of said shared band RF signals; and n bandpass filters each having an input and an output, the input of one bandpass filter connected directly to a signal input and each of the other of said bandpass filters having their input connected to one of the mixers such that each mixer is connected to one of the bandpass filters, the outputs of all bandpass filters being connected to a common node and not connected to a combiner or splitter wherein each of the bandpass filters has a bandwidth that does not overlap a bandwidth of any of the other bandpass filters.

34. An RF block conversion apparatus for processing four shared band RF signals in a broadband two-way communication system, said apparatus comprising:

four signal inputs, one for each of the four shared band RF signals, three mixers, each mixer attached to one of the four signal inputs, at least one generator generating three oscillator signals, each of a different RF frequency and connected to the mixers such that each mixer receives a different one of the three oscillator signals and converts one of said shared band RF signals; and four bandpass filters each having an input and an output, the input of one bandpass filter connected directly to a signal input and each of the other of said bandpass filters having their input connected to one of the mixers such that each mixer is connected to one of the bandpass filters, the outputs of all bandpass filters being connected to a common node and not connected to a combiner or splitter wherein each of the bandpass filters has a bandwidth that does not overlap a bandwidth of any of the other bandpass filters.

* * * * *